United States Patent [19]

Kawashima

[11] Patent Number: 5,649,828

[45] Date of Patent: Jul. 22, 1997

[54] WRITING BOARD SYSTEM

[76] Inventor: Kiyoharu Kawashima, 5-7, Esaka-cho 5-chome, Suita, Osaka-fu, Japan

[21] Appl. No.: 489,368

[22] Filed: Jun. 12, 1995

[30] Foreign Application Priority Data

Jun. 29, 1994 [JP] Japan .................................. 6-171915
Dec. 20, 1994 [JP] Japan .................................. 6-335638

[51] Int. Cl.$^6$ .............................................. B43L 1/00
[52] U.S. Cl. ........................... 434/411; 434/417; 434/408
[58] Field of Search ............................... 434/408, 417, 434/412, 411; 106/19 A, 21 A, 22 B

[56] References Cited

U.S. PATENT DOCUMENTS

| 1,227,205 | 5/1917 | Sartakoff | 434/411 |
| 3,163,943 | 1/1965 | Bell | |
| 4,907,903 | 3/1990 | Kawashima | 401/151 |

FOREIGN PATENT DOCUMENTS

| 679884 | 4/1966 | Belgium . |
| 700613 | 6/1967 | Belgium . |
| 1059272 | 7/1979 | Canada . |
| 1518669 | 2/1968 | France . |
| 2712492 | 9/1978 | Germany . |

OTHER PUBLICATIONS

Patent Abstracts of Japan, vol. 018, No. 619 (C-1278) 25 Nov. 1994.

Patent Abstracts of Japan, vol. 940, No. 012 6 Dec. 1994.

*Primary Examiner*—Jeffrey A. Smith
*Attorney, Agent, or Firm*—Birch, Stewart, Kolasch & Birch, LLP

[57] ABSTRACT

A writing board system comprises a white board having a writing surface for receiving a written mark thereupon, a liquid tank filled with water liquid for erasing the written mark from the writing surface, an applicator for applying the liquid in the liquid tank onto the writing surface, and a writing implement having an ink including at least one electron donative coloring compound selected from the group consisting of 2-{2-[4-(dodecyloxy)-3-metoxyphenl]-ethenyl}quinoline, 3-cyclohexylamino-6-chlorofluoran, 3-diethyl amino benzo [a]-fluoran, 3-(4-diethylamino-2-etoxyphenyl)-3-(1-ethyl-2-methylindol-3-yl)-4-azaphthalide, 3.3 bis(4-diethylamino-2-etoxyphenyle)-4-azaphthalide, and 3-cyclohexyl methyl amino-6-methyl-7-anilinofluoran, and an electron acceptive developing compound selected from the group consisting of zinc salicylate and bisphenol A.

8 Claims, 17 Drawing Sheets

WRITING BOARD SYSTEM

BACKGROUND OF THE INVENTION

The present invention relates to a writing board device for erasing the written mark on a white board by applying water or other liquid on the writing surface.

FIELD OF THE INVENTION

Recently, in classroom, conference, meeting, briefing or the like, instead of the blackboard using chalk, the whiteboard for writing with water-based felt pen or the like is widely used. In this kind, enamel or paint is baked at high temperature on the surface of a board of steel or the like to form a non-osmotic smooth writing surface, and the writing implement is a felt-tipped pen having powder pigment suspended and agitated in alcohol. Therefore, the written mark is only a deposit of powder pigment without binder, and it can be easily erased by wiping with an eraser using a dry cloth or the like.

In such conventional writing implement, however, the wiped powder pigment is transferred to the eraser, and it is frequently required to clean the eraser itself, or the pigment scatters about to contaminate the environment.

Accordingly, the present inventor disclosed, in the Japanese patent application (application No. Hei. 6-218089), a novel anhydrous ink mixing an electron donative coloring compound of one or more types selected from a group consisting of 2-{2-[4-(dodecyloxy)-3-metoxyphenl]-ethenyl}quinoline, 3-cyclohexylamino-6-chlorofluoran, 3-diethyl amino benzo[a]-fluoran, 3-(4-diethylamino-2-etoxyphenyl)-3-(1-ethyl-2-methylindol-3-yl)-4-azaphthalide, 3.3-bis(4-diethylamino-2-etoxyphenyle)-4-azaphthalide, and 3-cyclohexyl methyl amino-6-methyl-7-anilinofluoran, and an electron acceptive developing compound selected from a group consisting of zinc salicylate and bisphenol A, and proposed to solve the above problems by using it.

The ink develops a color by molecular contact between the coloring compound and developing compound, and returns colorless by losing the effect of developing compound by contact with water, and by making use of this character, the written mark can be erased by decoloring the ink itself by chemical reaction by water, not by wiping off the pigment itself.

Therefore, for erasing the written mark of this ink, new erasing means different from the conventional eraser such as dry cloth is needed.

SUMMARY OF THE INVENTION

The invention is hence devised in the light of such situation, and it is an object thereof to present a writing board device capable of solving the problems by applying water in the liquid tank on the writing surface.

According to one aspect of the present invention, a writing board device comprising a white board having a writing surface to be written upon by a writing implement, a liquid tank filled with liquid for erasing the written mark, and an applicator for applying the liquid in the liquid tank onto the writing surface.

The writing implement preferably has an anhydrous ink comprising an electron donative coloring compound of one or more types selected from the group consisting of 2-{2-[4-(dodecyloxy)-3-metoxyphenl]-ethenyl}quinoline, 3-cyclohexylamino-6-chlorofluoran, 3-diethyl amino benzo[a]-fluoran, 3-(4-diethylamino-2-etoxyphenyl)-3-(1-ethyl-2-methylindol-3-yl)-4-azaphthalide, 3.3-bis(4-diethylamino-2-etoxyphenyle)-4-azaphthalide, and 3-cyclohexyl methyl amino-6-methyl-7-anilinofluoran, and an electron acceptive developing compound selected from the group consisting of zinc salicylate and bisphenol A, and the liquid is water.

The applicator comprises preferably a rubbing element composed of sponge or brush which soaks up the liquid and rubs on the writing surface together with the liquid.

The device also comprises preferably a pump for feeding the liquid in the liquid tank onto the writing surface, and/or a blade rubber for dripping the liquid applied on the writing surface.

The writing board device of the invention applies liquid, for example, water onto the writing surface by using an applicator. Therefore, the written mark by the ink proposed in the Japanese patent application (application No. Hei. 6-218089) can be erased easily and uniformly, and new writing is allowed after being dried, and soiling of the surroundings can be prevented.

As the applicator, when a rubbing element rubbing the writing surface is used, if the writing surface is processed by mat treatment, the ink and water getting into tiny asperities on the mat treated surface are easily brought into mutual contact to decolor with assurity. Moreover, the decolored ink itself is scraped off the writing surface by rubbing, and therefore if, for example, the coloring compound for the ink composed of zinc salicylate and bisphenol A is applied on the writing surface, the writing surface can be kept clean without coloring again. Besides, the device comprises a liquid tank, and is capable of maintaining the decoloring and cleaning capacity for a long time. Still more, by removal of the ink, water is not degenerated or contaminated, and it is safe, and the water can be recycled, for example, by filtering with a filter, and the maintenance is enhanced.

When the rubbing element is used, for example, when a pen for a conventional whiteboard is used as the writing implement, it can be removed cleanly by water and rubbing, without scattering the powder pigment, and the scope of use can be expanded.

In addition, if the white board is formed by a board, and the applicator is mounted on a sliding frame extending above the writing surface and being movable along the writing surface, nearly the entire surface of the writing surface can be effectively by moving the sliding frame from one end to the other end of the writing surface. Similarly, if the white board is formed by a loop sheet and a support frame rotatably supporting the loop sheet, and the applicator is disposed on this support frame, the nearly entire surface of the writing surface can be cleaned by rotation of the loop sheet.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

Figure 1:
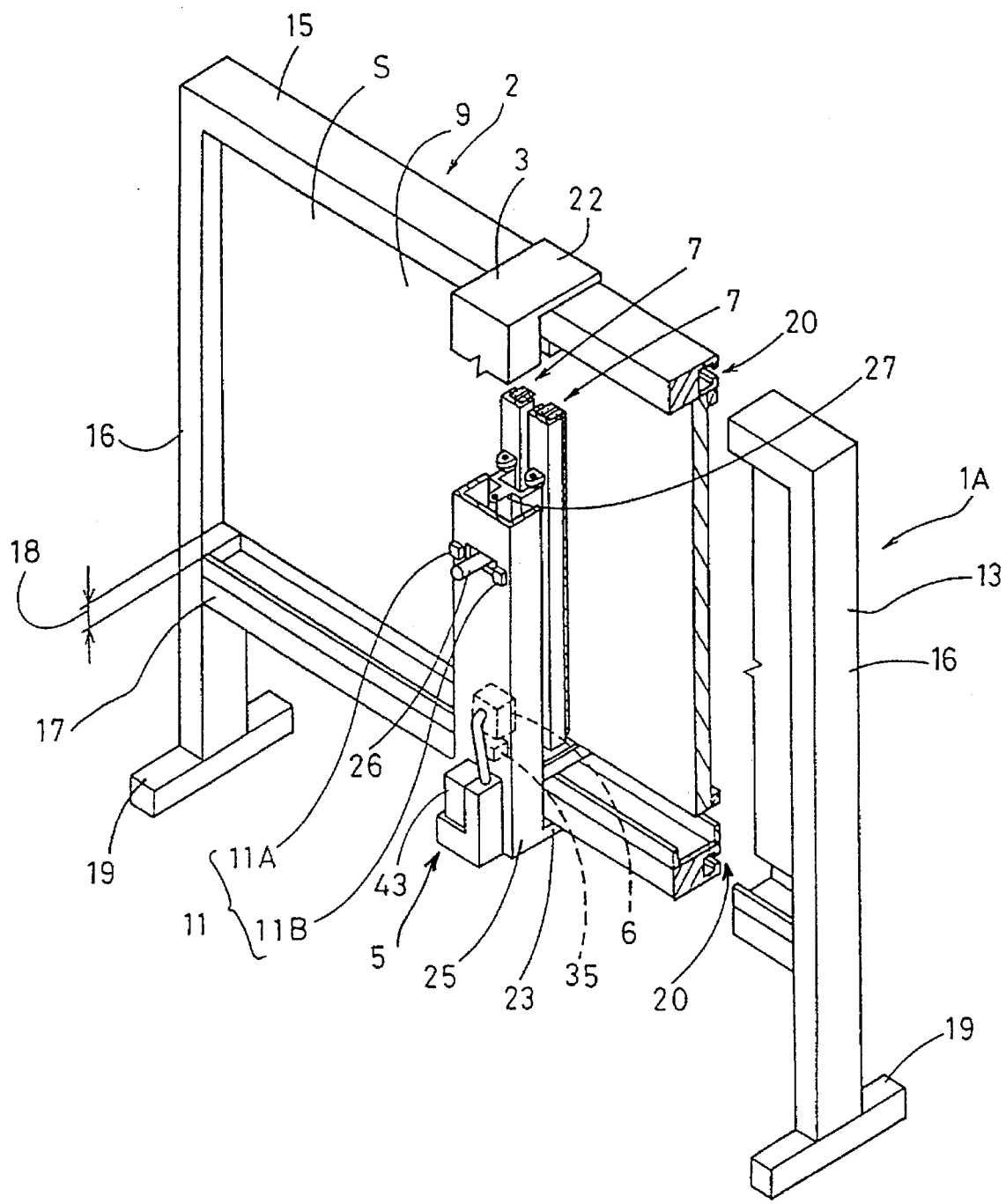
FIG. 1 is a perspective view showing a device of a first embodiment of the invention.
Figure 2:
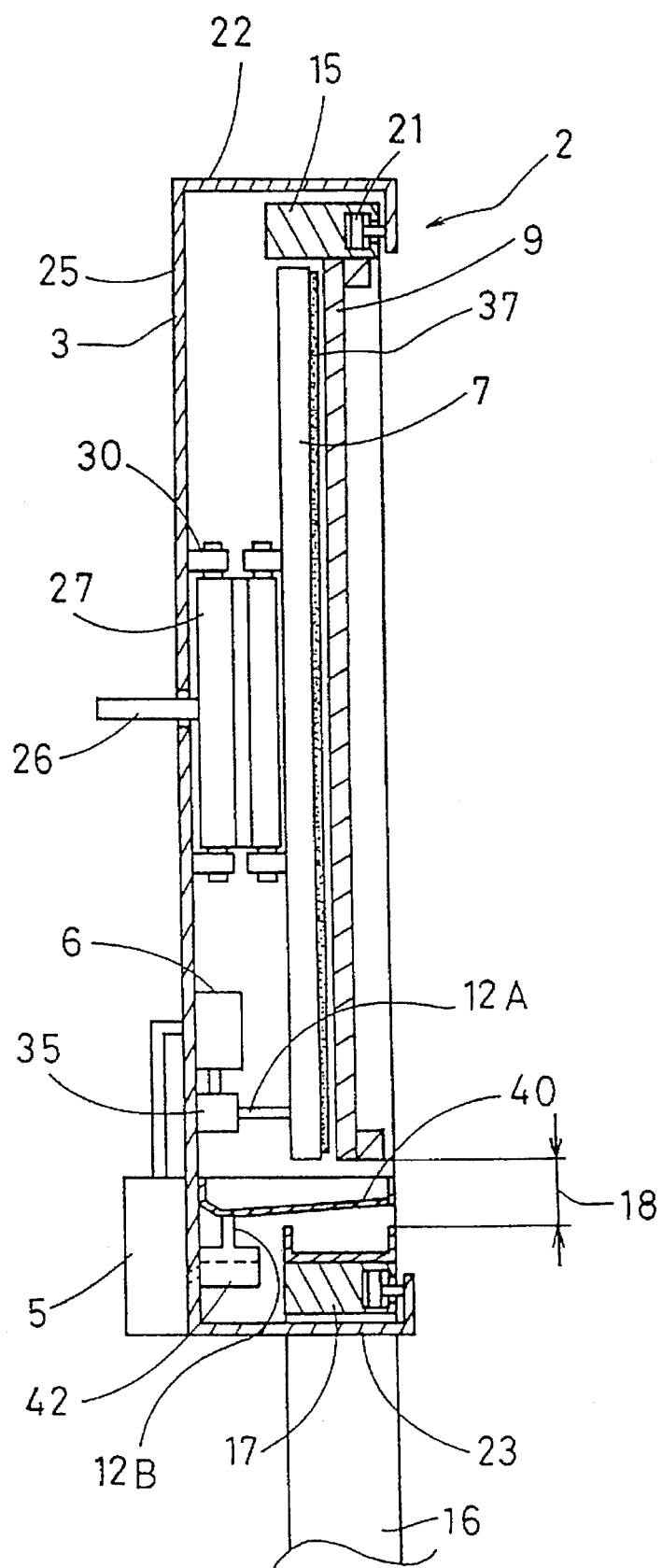
FIG. 2 is its schematic sectional view.

A writing board device 1 comprises a white board 2 having a writing surface S to be written upon by a writing implement, a liquid tank 5 filled with liquid for erasing the written marks, and an applicator 7 for applying the liquid in the liquid tank 5 onto the writing surface S.

The writing implement is preferably a felt-tipped pen or the like using an ink mixing an electron donative coloring compound of one or more types selected from the group consisting of 2-{2-[4-(dodecyloxy)-3-metoxyphenl]-ethenyl}quinoline, 3-cyclohexylamino-6-chlorofluoran, 3-diethyl amino benzo[a]-fluoran, 3-(4-diethylamino-2-etoxyphenyl)-3-(1-ethyl-2-methylindol-3-yl)-4-azaphthalide, 3.3-bis(4-diethylamino-2-etoxyphenyle)-4-azaphthalide, and 3-cyclohexyl methyl amino-6-methyl-7-anilinofluoran, and an electron acceptive developing compound selected from the group consisting of zinc salicylate and bisphenol A, in an anhydrous solvent such as ethanol and alcohol. As the liquid for erasing the written mark, for example, water is used.

The chemical formula of the electron donative coloring compound is shown below, and examples of ink using the electron donative coloring compound are listed in Table 1.

*2-{2-[4-(dodecyloxy)-3-metoxyphenl]-ethenyl} quinoline

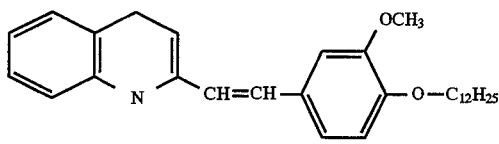

*3-cyclohexylamino-6-chlorofluoran

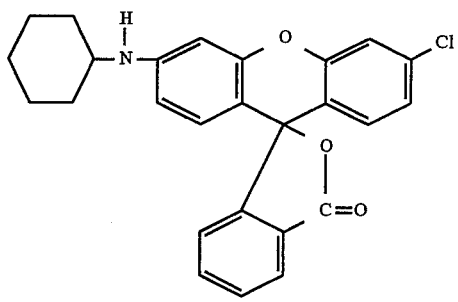

-continued

*3-diethyl amino benzo[a]-fluoran

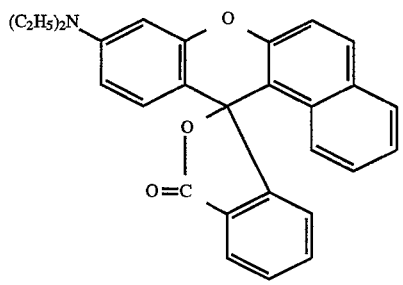

*3-(4-diethylamino-2-etoxyphenyl)-3-(1-ethyl-2-methylindol-3-yl)-4-azaphthalide

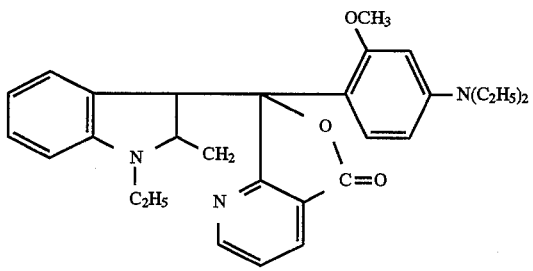

*3.3-bis(4-diethylamino-2-etoxyphenyle)-4-azaphthalide

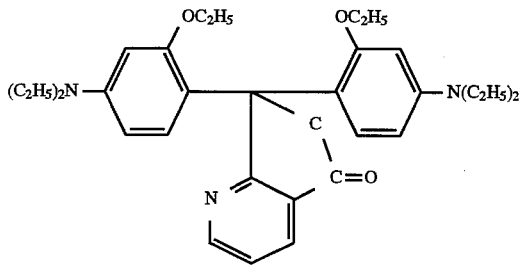

*3-cyclohexyl methyl amino-6-methyl-7-anilinofluoran

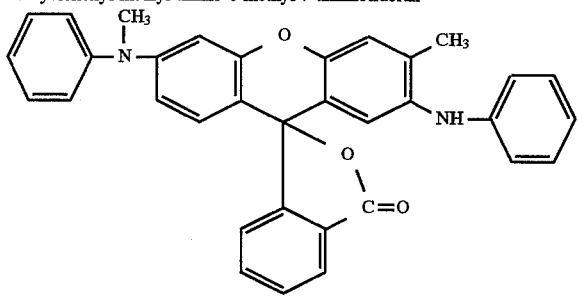

TABLE 1

| Color of Ink (wt %) | Sample | | | | | | |
|---|---|---|---|---|---|---|---|
| | No. 1 yellow | No. 2 orange yellow | No. 3 pink | No. 4 sky blue | No. 5 green | No. 6 purple | No. 7 black |
| *2-(2-[4-(dodecyloxy)-3-metoxyphenl]-ethenyl) quinoline | 5 | | | | 5 | | |
| *3-cyclohexylamino-6-chlorofluoran | | 7 | | | | | |
| *3-diethyl amino benzo[a]-fluoran | | | 12 | | | 6 | |
| *3-(A-diethylanino-2-etoxyphenyl)-3-(1-ethyl-2-methylindol-3-yl)-4-azaphthalide | | | | | | 0.3 | |
| *3.3-bis(4-diethylamino-2-etoxyphenyle)-4-azaphthalide | | | | 3 | 0.25 | | |
| *3-cyclohexyl methyl amino-6-methyl | | | | | | | 15 |

-continued

| -7-anilinofluoran | | | | | | | |
|---|---|---|---|---|---|---|---|
| *alchohols solvent | 69 | 66.2 | 55.5 | 73 | 68.5 | 68 | 52.5 |
| *zinc salicylate | 5 | 5.8 | 9 | 3 | 5.25 | 4.7 | 9 |
| *nonionic surface active agent | 21 | 21 | 20.5 | 21 | 21 | 21 | 20.5 |

In the device 1A of a first device shown in FIG. 1 to FIG. 7, the white board 2 is a board 9, and the applicator 7 is provided on a sliding frame 3 movable along the writing surface S.

The board 9 is a wide rectangular white board, and on at least one side thereof is formed a substantially white writing surface S by baking enamel or paint at high temperature on a steel surface. The writing surface S may be processed by mat treatment or the like to decrease the gloss so that reflection of the illuminating light is suppressed. The board 9 is fixed and supported on a support frame 15 13 in this embodiment.

The support frame 13 is a portal framework mutually joining an upper lateral frame and vertical frames 16, 16 for supporting the upper edge and both side edge of the board 9. Between the vertical frames 16, 16, a lower lateral frame 17 is stretched, extending nearly parallel across an interval 18 from the lower edge of or the board 9. A leg 19 having a wheel (not shown) of caster or the like is disposed at the lower end of each vertical frame 16. In the embodiment, in the upper and lower lateral frames 15, 17, guide rails 20 extending horizontally along each lateral frame and opening at the rear end are individually formed. The sliding frame 3 is supported by the guide rails 20 so as to be free to move laterally along the writing surface S.

The sliding frame 3 comprises upper and lower support arm pieces 22, 23, which have rollers 21 rolling on the guide rail 20 and extend forward across above the lateral frame 15 and below the lateral frame 17, and a shell 25, which extends vertically above the writing surface S by linking between the support arm pieces 22, 23. In this embodiment, the sliding frame 3 moves laterally along the guide rail 20 by manual pushing and pulling operation in the lateral direction. On the shell 25 of the sliding frame 3, a pair of applicators 7, 7 are provided parallel through a grip 27 having a handle 25 for manual operation. The shell 25 is, as shown in FIG. 3, formed in a pi-section folding side pieces 25B, 25B extending backward at both side edges of a base piece 25A parallel to the writing surface S, and mounting pieces 30, 30 for mounting the grip 27 project backward above and beneath across a gap nearly in the middle of the base piece 25A.

Figure 3:
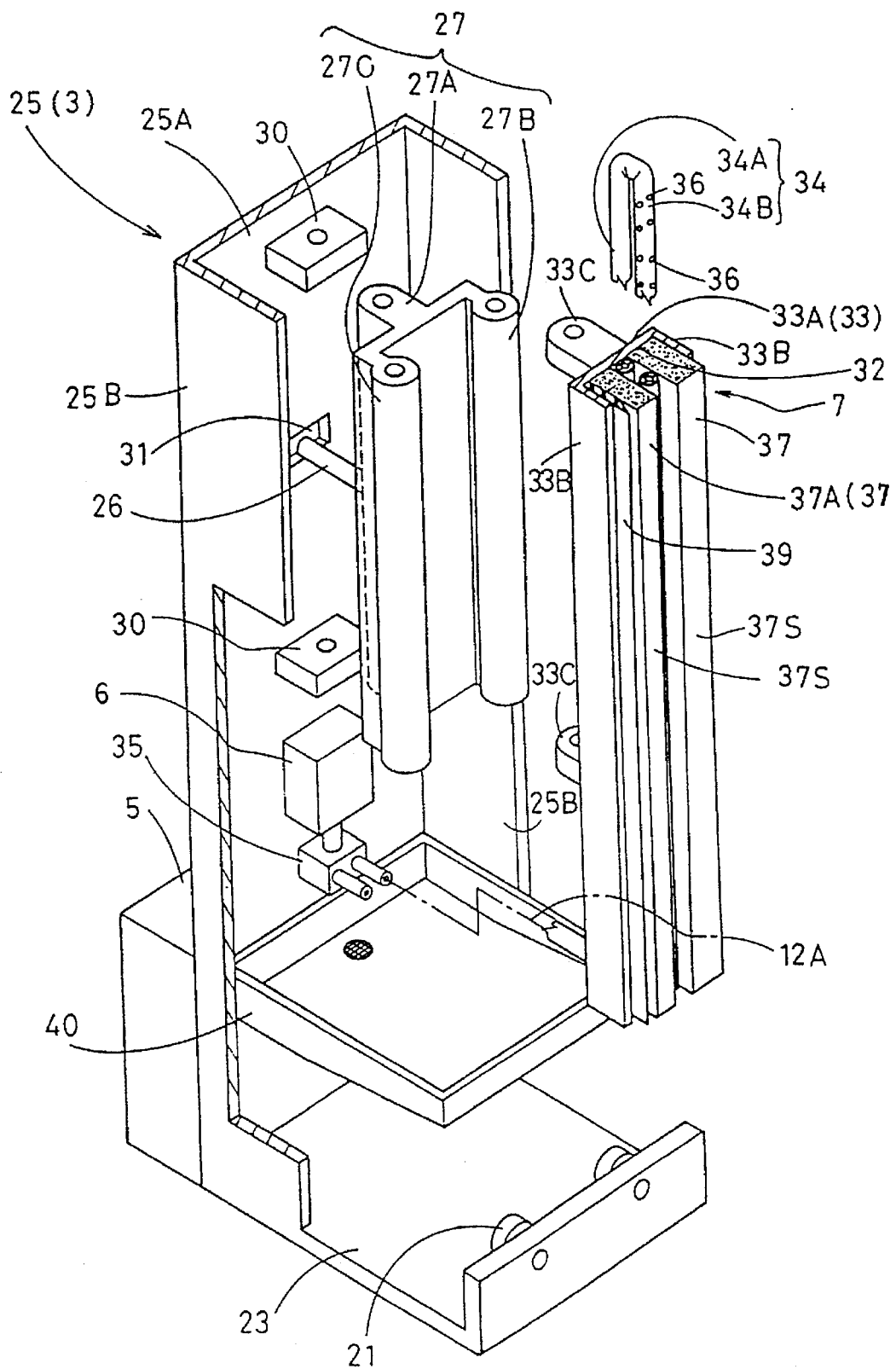
FIG. 3 is a perspective exploded view showing a sliding frame and an applicator.
Figure 4:
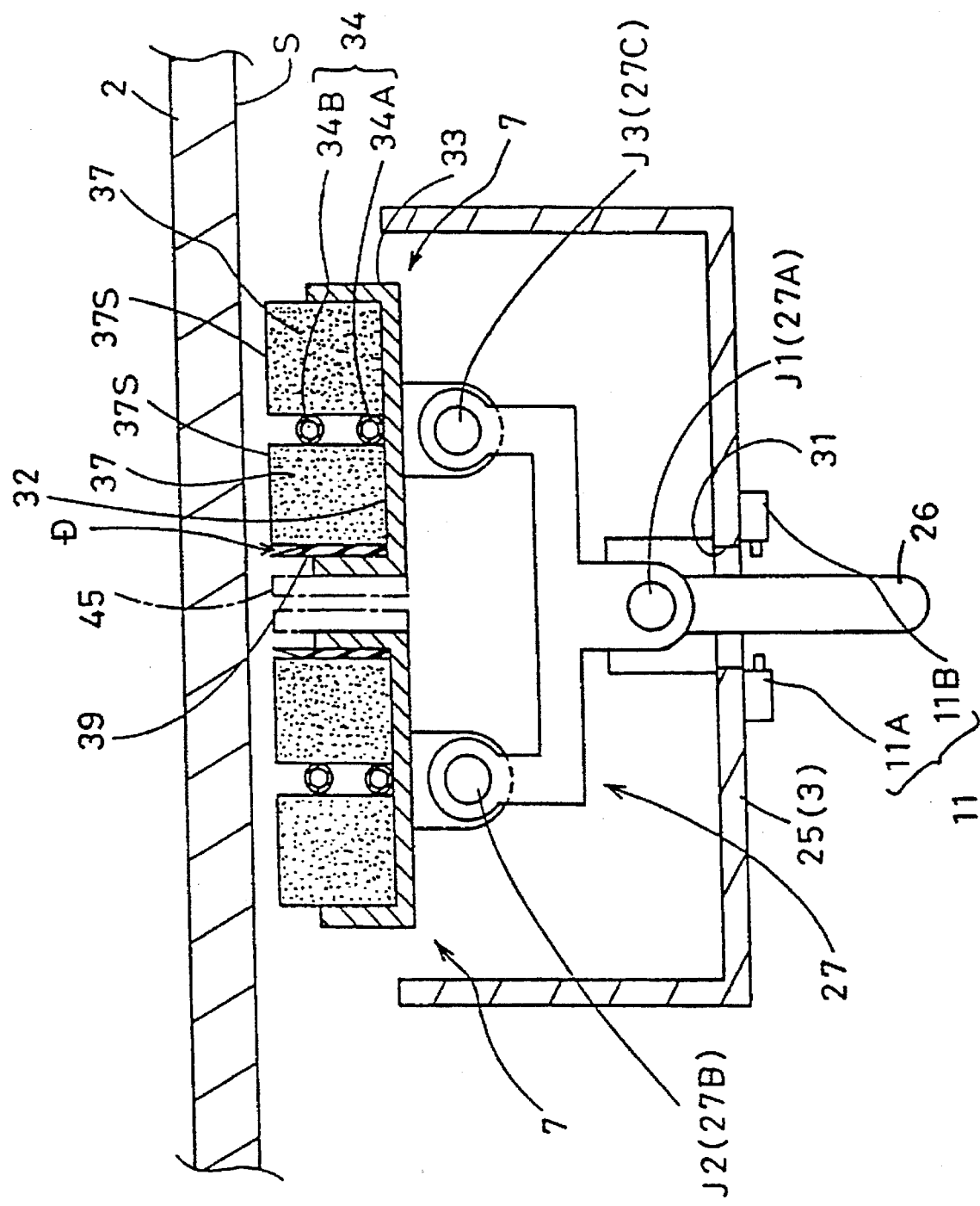
FIG. 4 is a sectional view showing application.

The grip 27 is, as shown in FIG. 3 and FIG. 4, formed in a T-section comprising a pivotal part 27A having a pivotal point J1 mounted on the mounting pieces 30 around the vertical axial center, and pivotal support parts 27A, 27C having pivotal support points J2, J3 for surrounding the pair of applicators 27B, 27C around the vertical axial center. The pivotal point J1 is positioned on the perpendicular bisector of the pivotal support points J2, J3, and the pivotal part 27A has the handle 27 projecting forward on the perpendicular bisector. A wide insertion port 31 for passing the handle 26 is pierced in the shell 25 of the sliding frame 3.

Figure 5:
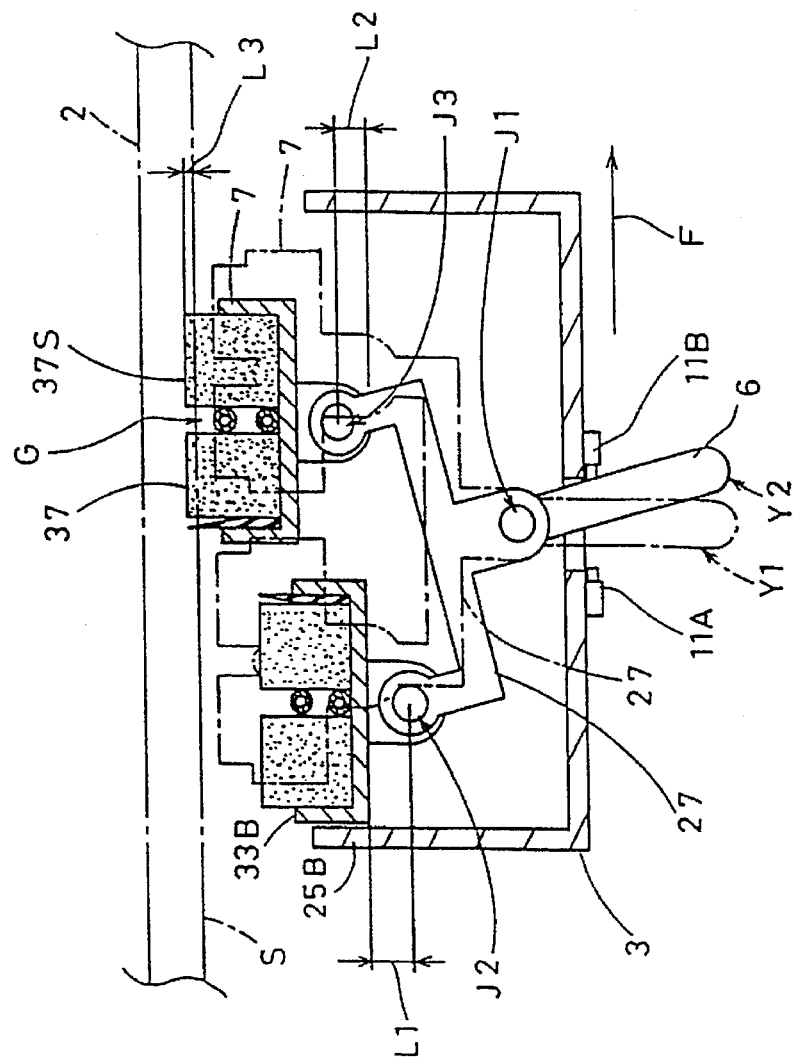
FIG. 5 is a sectional view showing operation in moving state of the applicator.

Therefore, as shown in FIG. 5, by the moving operation in, for example, the right direction by the handle 26, the grip 27 tilts about the pivotal point J1 from the reference state Y1 perpendicular to the moving direction F of the handle 26 to the slant state J2 of the handle 26 tilting in the moving direction until, for example, abutting against the side end of the insertion port 31. The sliding frame 3 moves laterally in the same direction F in this slant state Y2, and at this time one pivotal support point J2 retreats by distance L1 to the spacing side from the writing surface S by this tilting, while the other pivotal support point J3 moves forward by the distance L2 to the approaching side. Therefore, the grip 27 functions as changeover means of the applicators 7 by tilting the handle 26 in the moving direction F when moving the sliding frame 3 laterally, or pressing and rubbing selectively only the applicator 7 of the moving direction F side, out of the parallel applicators 7, 7, on the writing surface S.

Each applicator 7 comprises, as shown in FIG. 3 and FIG. 4, a long holder having a recess 32 opening backward and extending vertically nearly along the overall height of the writing surface, and a feed pipe 34 and a rubbing element 37 are provided in the recess 32 of the holder 33. The holder 33, in this example, is formed nearly in a pi-section folding side plate pieces 33B, 33B at both side edges of the base plate piece 33A, and a pivotal pieces 33C mounted on the grip 37 projects forward at the position of the pivotal support points J2, J3 in the base plate piece 33A. Between the grip 27 and holder 33, it is preferable to dispose position maintaining means (not shown) using a spring material or the like, in order to keep the rubbing surface 37S of the rubbing element 37 opposite to the writing surface S in the reference state Y1. At this time, in the slant state Y2, as shown in FIG. 5, the retreating side holder 33 has its side plate piece 33B overlapping the side piece 35B, while the forwarding side holder 33 has the rubbing element 33 pressed against the writing surface S, thereby keeping the opposite position by overcoming the position maintaining means.

The feed pipe 34 comprises an upstream side pipe 34A having the lower end communicating with the liquid tank 5 and extending upward, and a downstream side pipe 34B folded back from the upper end of the upstream side pipe 34A through a U-part and closed at the lower end extending downward, and is disposed nearly along the center of the recess 32. In the downstream side pipe 34B, plural pores 36 opening toward the writing surface S are pierced at proper pitches. These pores 36 form nozzle holes for discharging the liquid supplied from the liquid tank 5 toward. the writing surface S.

The liquid tank 5 is a container installed in the lower part of the sliding frame 3, and a cartridge type water tank 43 is detachably installed in this example to hold always a specified amount of liquid, and the liquid is supplied. Between the liquid tank 5 and the feed pipe 34, a feed flow path 12A is connected, in which a pump 6 for pumping the liquid in the liquid tank 5 and a changeover valve 35 such as three-way valve for selectively communicating with the feed pipe 35 of the applicator 7 of the forwarding side of the pumped liquid are interposed. The pump 6 and changeover valve 35 are provided at the rear side of the shell 25 of the sliding frame 3. A switch 11 for operating the pump 6 and changeover valve 35 comprises on/off switches 11A, 11B provided at both side edges of the insertion port 31 of the sliding frame 3, and the pump 6 is actuated as the handle 26 approaches the tilting side switch in the lateral move. The changeover switch 35 is also actuated by this tilting side switch, thereby opening the flow path to the applicator of the tilting side, that is, the forwarding side applicator, and closing the flow path to the retreating side applicator.

The rubbing element 37 is formed of, in this example, an elastic sponge material of high water absorption property. For example, in a block form in a rectangular section, it is disposed at both sides of the feed pipe 34. As the sponge material, the cellulose sponge mainly composed of wood pulp and non-wood pulp such as husk and grass roots is preferable because it is high in density of continuous foams and excellent in water absorption. The rubbing element 37 has such a size that the rubbing surface 37S confronting the writing surface S may be spaced from the writing surface S in the reference state Y1, and presses tightly with an compression allowance L3 at the forward position in the slant state Y2. Therefore, the applicator 7 can close the space G between the rubbing elements 37, 37 connecting the feed pipe 34 in the pressed state, thereby assuring the liquid discharged from the nozzle holes 36 to be applied sufficiently on the writing surface S without scattering outside. The rubbing element 37 partly absorbs water, and rubs against the writing surface S with the discharged liquid and absorbed liquid to apply the liquid on the entire width of the writing surface S, and rubs the writing surface S. Rubbing means herein to rub against each other with a specific pressure.

By forming the rubbing element 37 by a sponge material of high water absorption property, it can rub together with the liquid, having an adequate pressure, without injuring the writing surface S, and the ink securely contacts with the liquid to decolor, and the decolored ink can be removed from the writing surface S. To enhance the rubbing effect, the rubbing element 37 is preferably formed in a rectangular block with an increased rubbing surface. Or to increase soaking of liquid of the rubbing element 37, tiny holes toward the rubbing element 37 may be formed in the downstream side pipe 34B.

The applicator 7 in this embodiment is a rubber blade 39 for accelerating drying by dripping the liquid applied on the writing surface S. The rubber blade 39 is made of an elastic material, and is disposed, in each applicator 7 as shown in FIG. 4, at the further inside of the rubbing element 37A of the inward side, or, in this example, between the rubbing element 37A and the adjacent side plate piece 33B. The rubber blade 39 has a height nearly same as the rubbing surface 37S, and is tapered in section, thereby forming a gap D against the adjacent rubbing element 37A. Therefore, the rubber blade 39 presses to the writing surface S after application when the sliding frame 3 moves laterally, and drips the liquid applied on the writing surface S, thereby allowing new writing on the writing surface S. The dripped liquid passes through the gap D, and flows down effectively. Further inside of the rubber blade 39, a dry wiper 45 made of cloth material or sponge material of high water absorption property such as felt can be disposed exchangeably, so that the writing surface S can be dried more securely.

Beneath the applicator 7, excessively supplied liquid from the nozzle holes 36 and the liquid dripped by the rubber blade 39 are recovered in a pan 40 to prevent soiling of the floor. This pan 40 is, in this embodiment, attached to the shell 25 of the sliding frame 3, and is extended to the rear side of the writing surface S through the gap 18. The pan 40 and the liquid tank 5 communicate with each other through a feedback path 12B, and a filtering device 42 having an exchangeable filter to be reusable by filtering the recovered liquid is disposed in the feedback path 12B. In this embodiment, therefore, a liquid circulation route is formed by the feed flow path 12A and feedback path 12B, and the liquid consumption is decreased, while soiling of the device by the liquid is prevented. Besides, the liquid in the liquid tank 5 is preferred to be changed once in every week or about ten days in order to keep clean the writing board device 1. Hence it is hence preferred to furnish the liquid tank 5 with a drain valve for discharge (not shown).

Figure 7:
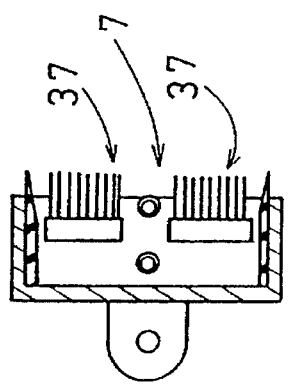
FIG. 7 is a sectional view showing a different embodiment of a rubbing element.
Figure 6:
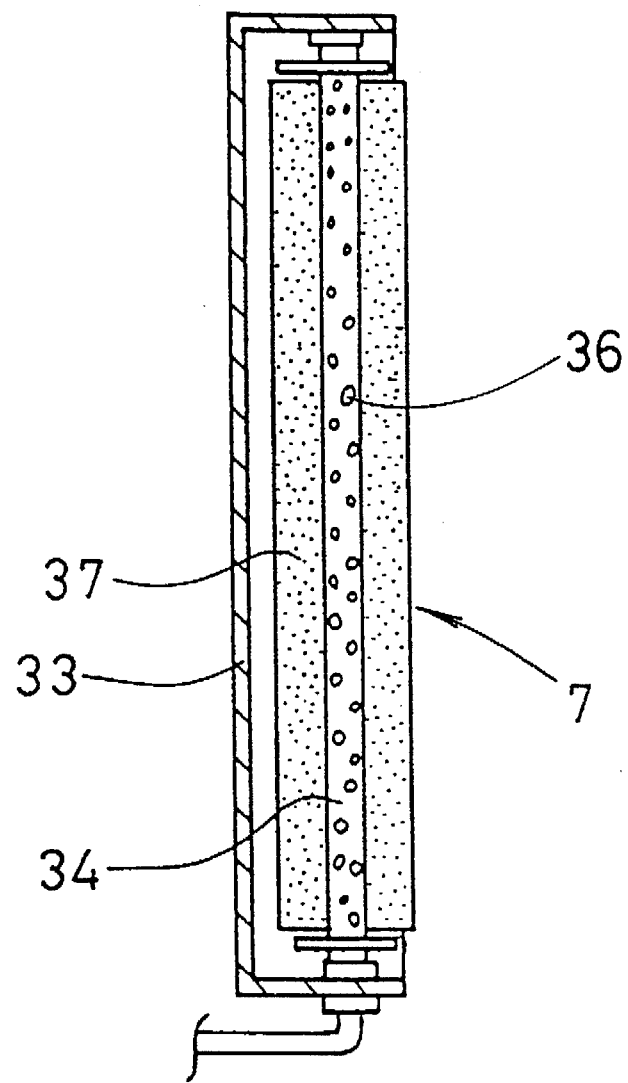
FIG. 6 is a sectional view showing other embodiment of a rubbing element.

The rubbing element 37 may be a roller having the sponge material formed cylindrically about the support shaft, and it is preferred to rotate and drive this roller in reverse direction of the moving direction by known driving means for the purpose of enhancing a high rubbing effect. At this time, as shown in FIG. 6, the feed pipe 34 having nozzle holes 36 may be used as support shaft. In such a case, the liquid discharged from the support shaft exudes through the rubbing element 37, and decreases scatter of the liquid, thereby contributing to the compact design of the applicator. As the rubbing element, aside from the sponge, cloth material of high water absorption property such as felt, or a brush using nylon bristles as shown in FIG. 7 may be also used. In such a case, the rubbing effect is exhibited by the tip of bristles, and liquid is soaked among the bristles. As the brush, a roller type rotary brush may be formed as mentioned above.

The sliding frame 3 may be supported movably in the vertical direction, or the guide rail 20 may be disposed on a plate 9, and the sliding frame may be directly supported on the plate 9.

(EXAMPLES)

Using the following applicators (A) to (F), water (liquid) was applied on each writing surface, and the writing surface was rubbed together with water, and the ink decoloring state of the written mark, and the removal state of the decolored, ink were compared, and the results are shown in Table 2. The ink, removal state was compared by the recoloring state when the ink coloring matter was applied. As the ink, sample 7 (black) in Table 1 was used.

The water application and rubbing means was composed as specified below:

(A) Using three knitted cords knitting cotton yarns in a tubular form, the knitted cords are brought into contact with the writing surface while feeding water thereon, and water is applied. (Applicator feed speed: 15 cm/sec)

(B) A rotary brush planting cotton piles is rotated at 300 rpm, and the writing surface is rubbed. Water is supplied to the rotary brush to soak. (Application feed speed: 15 cm/sec)

(C) Water from nozzle holes is directly discharged on the writing surface to apply water. (Applicator feed speed: 15 cm/sec)

(D) The writing surface is rubbed with a rectangular block made of sponge material. Water is fed to the block to soak. (Application feed speed: 40 to 50 cm/sec)

(E) The writing surface is rubbed with a rectangular block made of sponge material. Water is fed to the block to soak. (Applicator feed speed: 15 cm/sec)

(F) Water applied on the writing surface is wiped off by rubber blade. (Applicator feed speed: 15 cm/sec)

The decolored state and ink removal state were evaluated in four ranks 1 to 4 as follows.

1: Almost no effect

2: Slightly effective but insufficient.

3: Satisfactory but not perfect.
4: Almost perfectly erased.

TABLE 2

| Application, rubbing means: | A | A+B | B | B+B | C | C+F | D | E | E+F |
|---|---|---|---|---|---|---|---|---|---|
| Ink decolored state | 4 | 4 | 4 | 4 | 4 | 4 | 4 | 4 | 4 |
| Ink removal state | 1 | 2 | 2 | 3 | 1 | 3 | 2 | 3 | 4 |

As shown in Table 2, by application of water, the ink can be completely decolored, and rubbing by the block of sponge and rotary brush is effective for removing the ink. The rubber blade is known to contribute to removal of ink aside from the dripping effect. Therefore, the rubber blade functions as rubbing element, and it is more preferable to combine with other rubbing element such as sponge material.

Incidentally, as the liquid for erasing, a mixture of water and surface active agent, a mixture of surface active agent and solvent such as ethylene glycol or polyethylene glycol, or a mixture of the surface active agent and the solvent are used instead of water.

Referring then to FIGS. 8 to 13, a device 1B of a second embodiment is described, in which the white board 2 is composed of a loop sheet 47 and a support frame 48 supporting the sheet 47 rotatably in the lateral direction.

Figure 8:
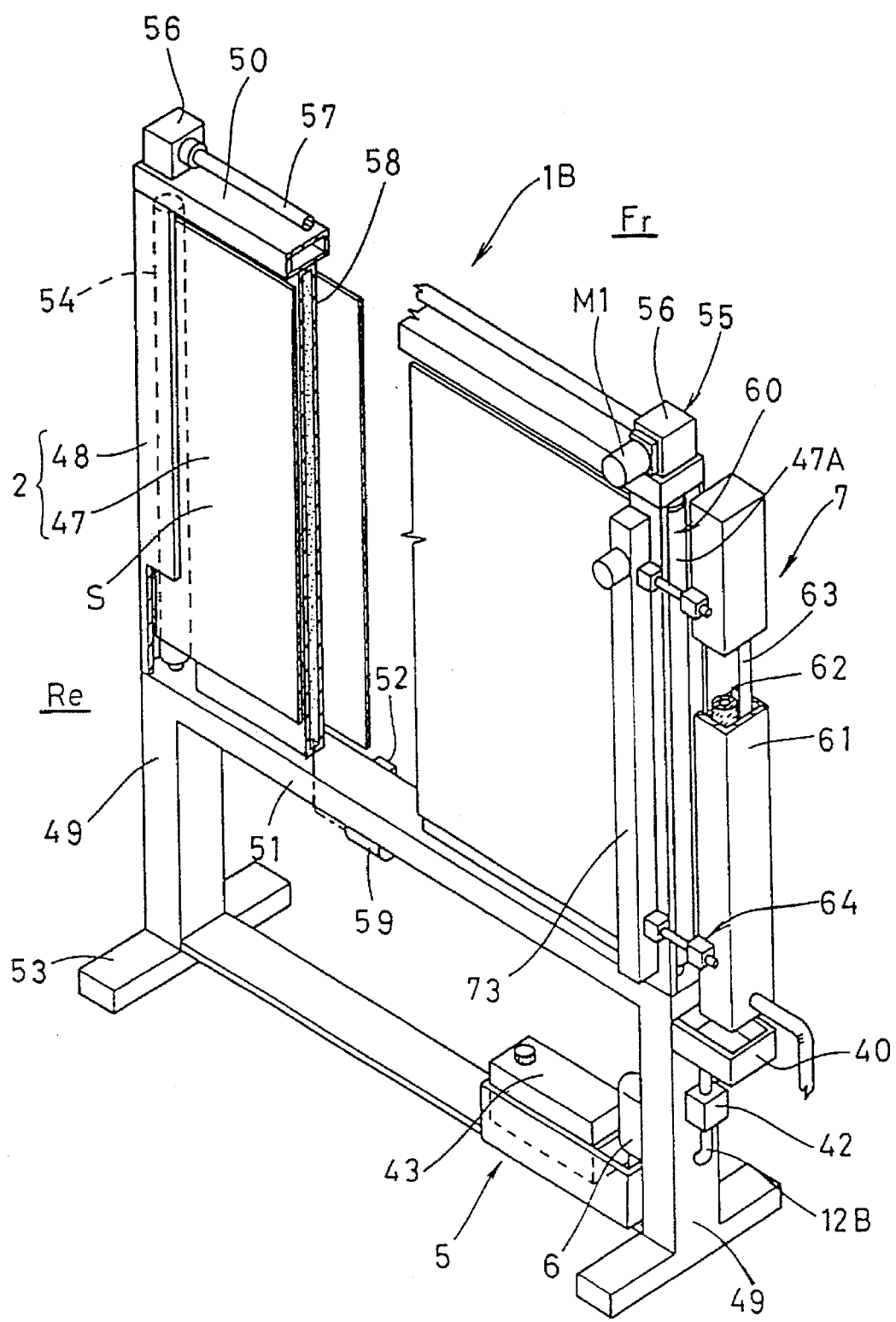
FIG. 8 is a perspective view showing a device of a second embodiment of the invention.

As shown in the drawings, the white board 2 of the device 1B of the second embodiment is composed of the sheet 47 and support frame 48. The sheet 47 is preferably made of, for example, a woven cloth of which face and back sides are coated with synthetic resin such as vinyl to form a non-expand/shrink waterproof sheet base material, being coated with fluororesin or the like. The outer surface of the sheet 47 used as the writing surface S is processed by mat treatment. FIG. 8 shows the device from the rear side Re.

The support frame 48 is of portal shape coupling between the upper ends and between the middle parts of a pair of vertical frames 49, 49 respectively by means of horizontal upper lateral frame and middle lateral frame 51, and a leg piece 53 is disposed at the lower end of the vertical frame 49. The support frame 48 also comprises a driving element 55 including a pair of support shafts 54 for supporting the sheet 47 rotatably in the lateral direction.

The driving element 55 comprises a pair of gear boxes 56 provided on the top of both ends of the lateral frame 50, a drive shaft 57 stretching between the gear boxes 56, 56, and a motor M1 coupled with one gear box 56 for driving the drive shaft 57, and this motor M1 is operated by a switch 52, for example, provided in the support frame 48.

Each vertical frame 49 is nearly in a pi-section opening the mutually confronting inward surfaces between the lateral frames 51, 51, and the support shaft 54 having the upper and lower ends pivoted rotatably by the support frame 48 is disposed in this pi-section. The upper end of each support shaft 54 is gear coupled with the gear box 56 individually, and each support shaft 54 is rotated and drive in the same direction by the motor M1, thereby assuring the wide and long sheet 47 to rotate. Or only one support shaft 54 may be driven, and the sheet 47 is stretched by proper tension means (not shown), for preventing looseness in the embodiment.

The support frame 48 is provided with a back plate 58 for the ease of writing by supporting the writing surface S of the sheet 47 from the back side like a desk pad, and the back plate 58 is formed in a hollow box in the embodiment linking between the lateral frames 50, 51, and a compressed air feeder 59 such as compressor attached to the lateral frame 51 is provided in the hollow space. Multiple fine pores communicating with the hollow space are pierced in the back plate 58, and when the sheet 47 rotates, compressed air is discharged from the pores, and excessive abrasion between the sheet 47 and back plate 58 is prevented, thereby extending the wear life of the sheet 47. Accordingly, the compressed air feeder 59 is operated synchronously or asynchronously with the motor M1 by the switch 52.

In the support frame 48, an opening 60 having the outward surface opened is formed in the vertical frame 59 at the downstream side of the peripheral direction of the white board 2 as seen from the front side Fr, and the sheet 47 is wound around the support shaft 54 to expose the folded winding part 47A, and the applicator 7 is provided in the opening 60.

The applicator 7 comprises a long box-shaped frame 61 attached to the opening 20, a rubbing element 62 accommodated inside, and a feed pipe 63 for feeding liquid.

The frame 61 formed in a pi-section opened in the inward surface confronting the opening 60, and is attached to the vertical frame 49 being spaced from the opening 60 through a guide 64. The guide 64 comprises, in this embodiment, plural parallel guide shafts 64A attached to the front and rear side of the vertical frame 49 and extending parallel to the support frame 47, and a guide pipe 64B attached to the frame 61 having guide holes communicating with the guide shafts 64A, and the frame 61 moves parallel along the guide shafts 64A from the mutually contacting position R1 of the rubbing element 62 and writing surface S to the separating position R2. In the frame 61, the rubbing element 62 and writing surface S may be joined so as to be free to space by means of hinge or the like.

The rubbing element 62 is a rotary roller in this embodiment, and integrally comprises a rubbing element 66 made of sponge or the like, around a central shaft 65 having upper and lower ends pivoted on the frame 61, being parallel to the support shaft 54.

The feed pipe 63 is erected parallel to the rubbing element 62, and tiny holes are pierced in the circumference toward the rubbing piece 66, and the liquid tank 5 is connected to the lower end of the feed pipe 63 through the pump 5.

The rubbing element 62 is rotated and driven in reverse direction of the peripheral direction of the sheet by known driving means (not shown), and the rubbing element 62 soaking the liquid rubs the writing surface S in the winding part 47A. Or, the liquid from the tiny holes in the feed pipe 63 may be injected like a shower on the writing surface S directly. The rubbing element 62 may be, besides, fixed so as not to rotate, or rotated and driven in the same direction as the peripheral direction, and the rotating speed at this time is different from the peripheral speed.

The rubbing element 62 may be formed with the feed pipe as the central shaft same as in FIG. 6.

Figure 10:
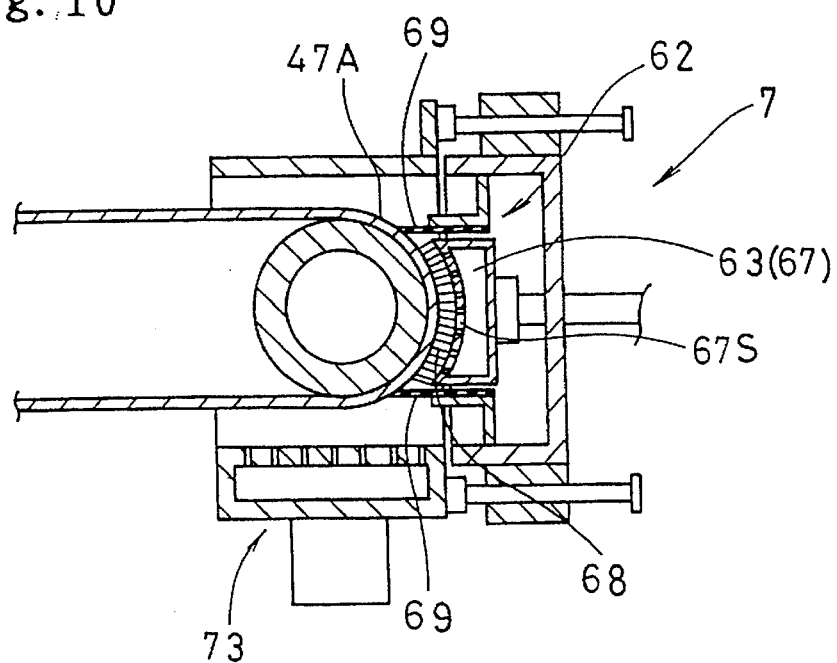
FIG. 10 is a schematic sectional view showing other another embodiment of a rubbing element.

FIG. 10 shows an example in which the rubbing element 62 is an antistatic brush. As shown in the drawing, for example, a surface 67S curved along the winding part 47A is formed in a base part 67 using the feed pipe 63, and plural nozzle holes are provided in the surface 67S, and bristles 68 are planted.

Figure 11:
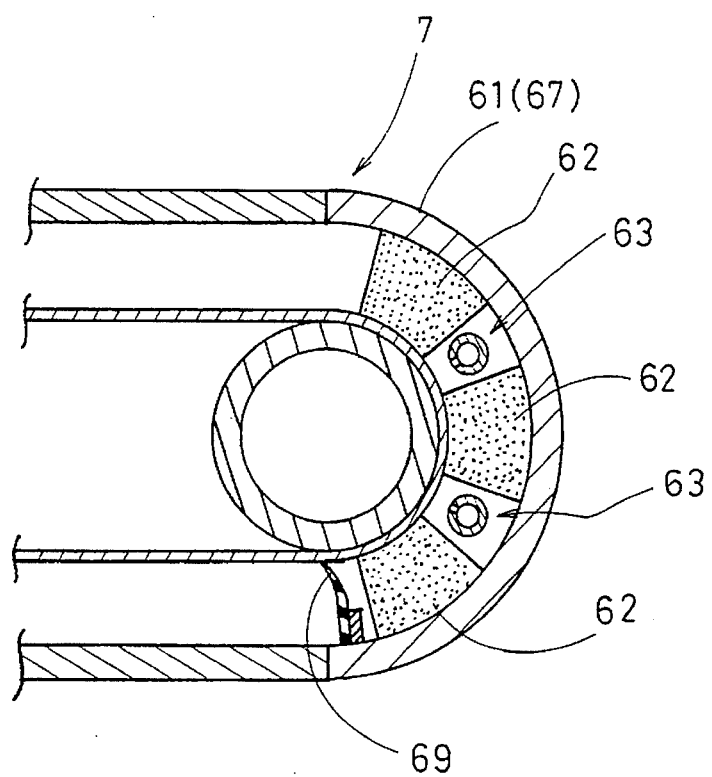
FIG. 11 is a schematic sectional view showing a different embodiment of a rubbing element.
Figure 20:
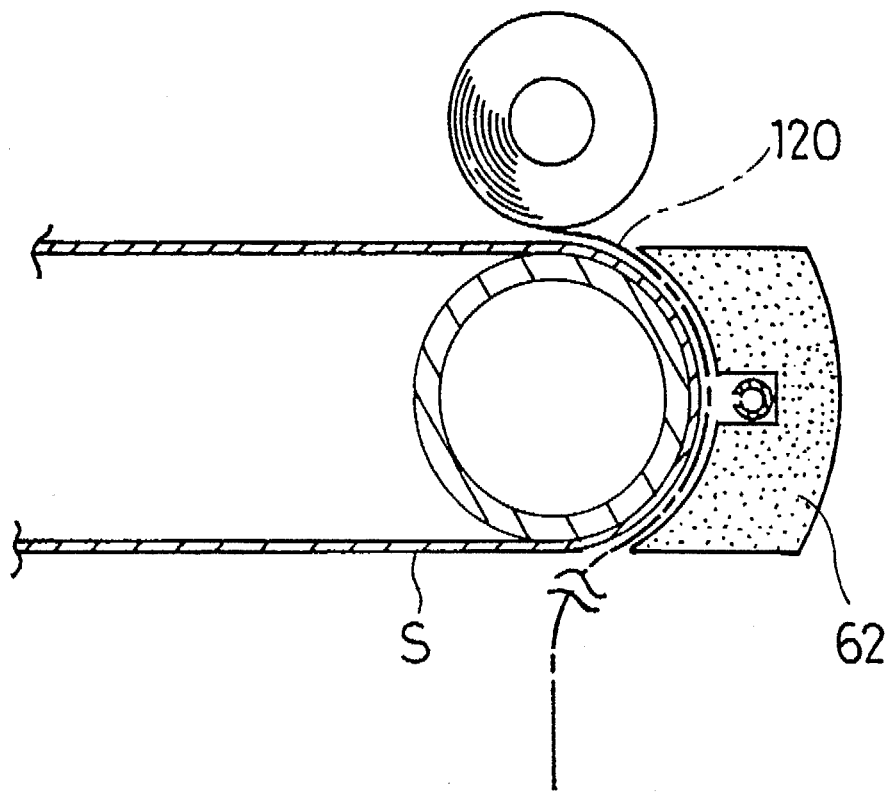
FIG. 20 is a schematic sectional view showing other embodiment of a rubbing element.

Incidentally, as shown in FIG. 11, in a base part 67 using the frame 61, plural rubbing elements 62 in block form made of sponge material may be disposed separately, and the feed pipe 63 may be fitted among the rubbing elements 62 to constitute like the applicator 7 in the first embodiment. On the other hand, it is possible to insert a rubbing sheet 120 between a element 62 and the writing surface S as shown in FIG. 20. The rubbing sheet 120 is stocked as a winding roll, and when the rubbed part of the sheet becomes soiled, a roll of the sheet 120 is rewound for a specific length and the soiled part cut off.

Figure 9:
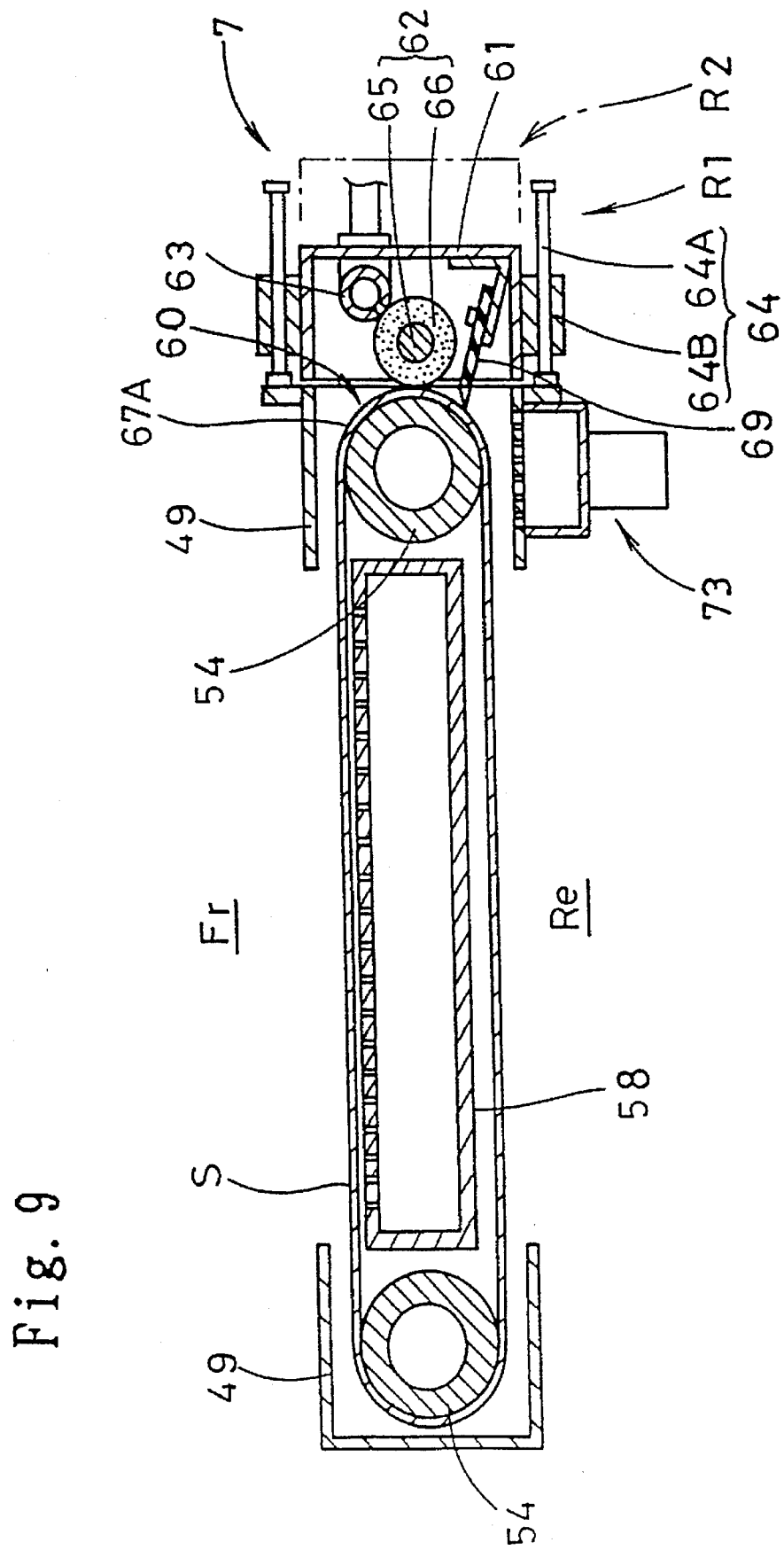
FIG. 9 is its schematic sectional view.

The applicator 7 is provided with rubber blade 69 for dripping as shown in FIG. 9. The rubber blade 69 is fixed at a downstream position of the rubbing elements 62, and this rubber blade 69 is useful for preventing the liquid from scattering widely, and hence it may be disposed at both upstream side and downstream side of the rubbing elements 62 as shown in FIG. 10.

In this embodiment, to further accelerate drying of the writing surface S, in the support frame 48, a drier 73 for forced drying is disposed at the downstream side of the rubber blade 69. The driver 73 is a fan heater in the embodiment, and when the sheet 47 rotates, hot air is blown nearly over the entire width of the dripped writing surface S. The drier 73 may be, aside from the blower, a heater making use of radiation heat, or without using drier 73, it may be dried in air.

The sum as in the first embodiment, as the liquid tank 5, a cartridge type water tank 43 is provided, and a pan 40 is provided beneath the applicator 7. A feedback path 12B having a filtering device 42 is connected between the pan 40 and liquid tank 5.

Figure 12:
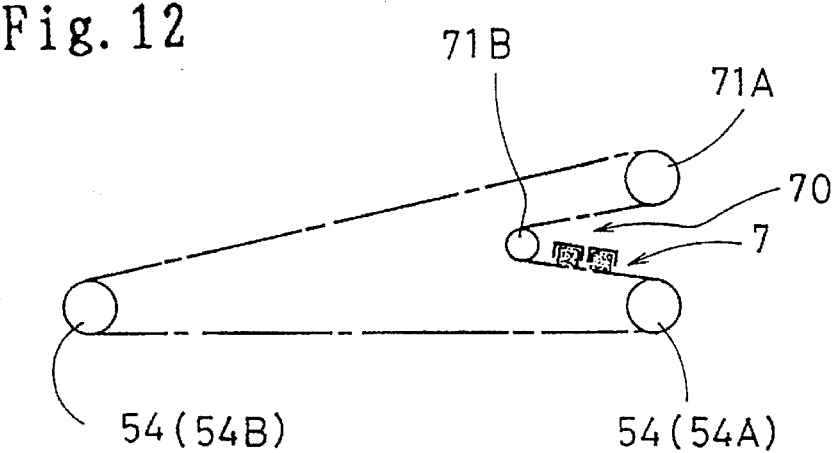
FIG. 12 is a schematic diagram showing other another winding state of a sheet.

The sheet 47 is wound, in addition to the support shafts 54, 54 as shown in FIG. 12, in a first auxiliary shaft 71A located behind one support shaft 54A, and a second auxiliary shaft 71B dislocated to the other support shaft 54B side between the first auxiliary shaft 71A and support shaft 54A, and a recess 70 is formed between the support shaft 54 and first and second auxiliary shafts 71A, 71B. In this recess 70, various applicators 7 are disposed so that the applicators 7 may be concealed.

Figure 13:
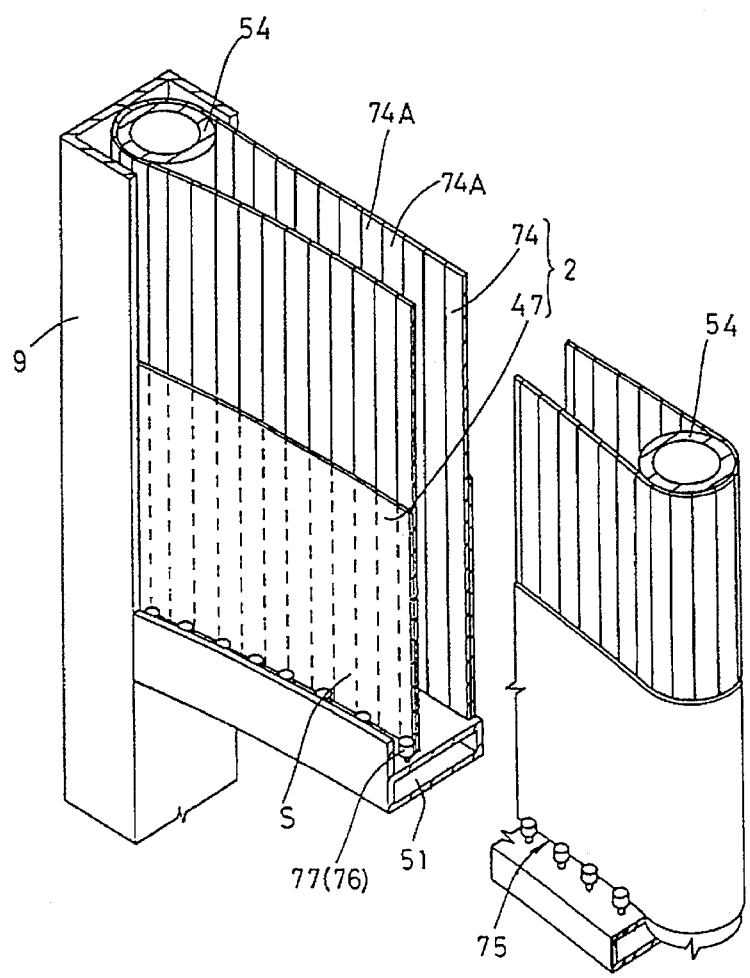
FIG. 13 is a partial perspective view showing a different embodiment of a white board.

FIG. 13 shows an example of white board 2 preferably used in a wide room such as a convention hall. As shown in the drawing, the white board 2 comprises a loop base board 74 flexibly coupling plural small long pieces 74A of light weight and high rigidity made of plastic or the like, and a sheet 47 integrally adhered to the outer circumference thereof, and the sheet 47 is wound between support shafts 54 together with the base board 74, and supported rotatably. The distance between the support shafts 75 is set relatively wide, and the peripheral trace 75 of the sheet 47 confronting the front side is curved in an concave arc form through a guide 76, thereby enabling to read from a wide writing surface S. The guide 76 is composed of a guide roller 77 arranged along the concave arc trace, for example, in the lateral frame pieces 50, 51. In other embodiment, using a concentric chain wheel with the support shaft 54, for example, a drive chain Is run along the peripheral trace 75 to suspend and support individually each base board 74 from the link piece of the drive chain, and the sheet 47 may be adhered to the entire outer circumference to compose the white board 2. At this time, each base board 74 is coupled flexibly and endlessly through the sheet 47 and drive chain, and the drive chain functions as the guide 76.

Figure 14:
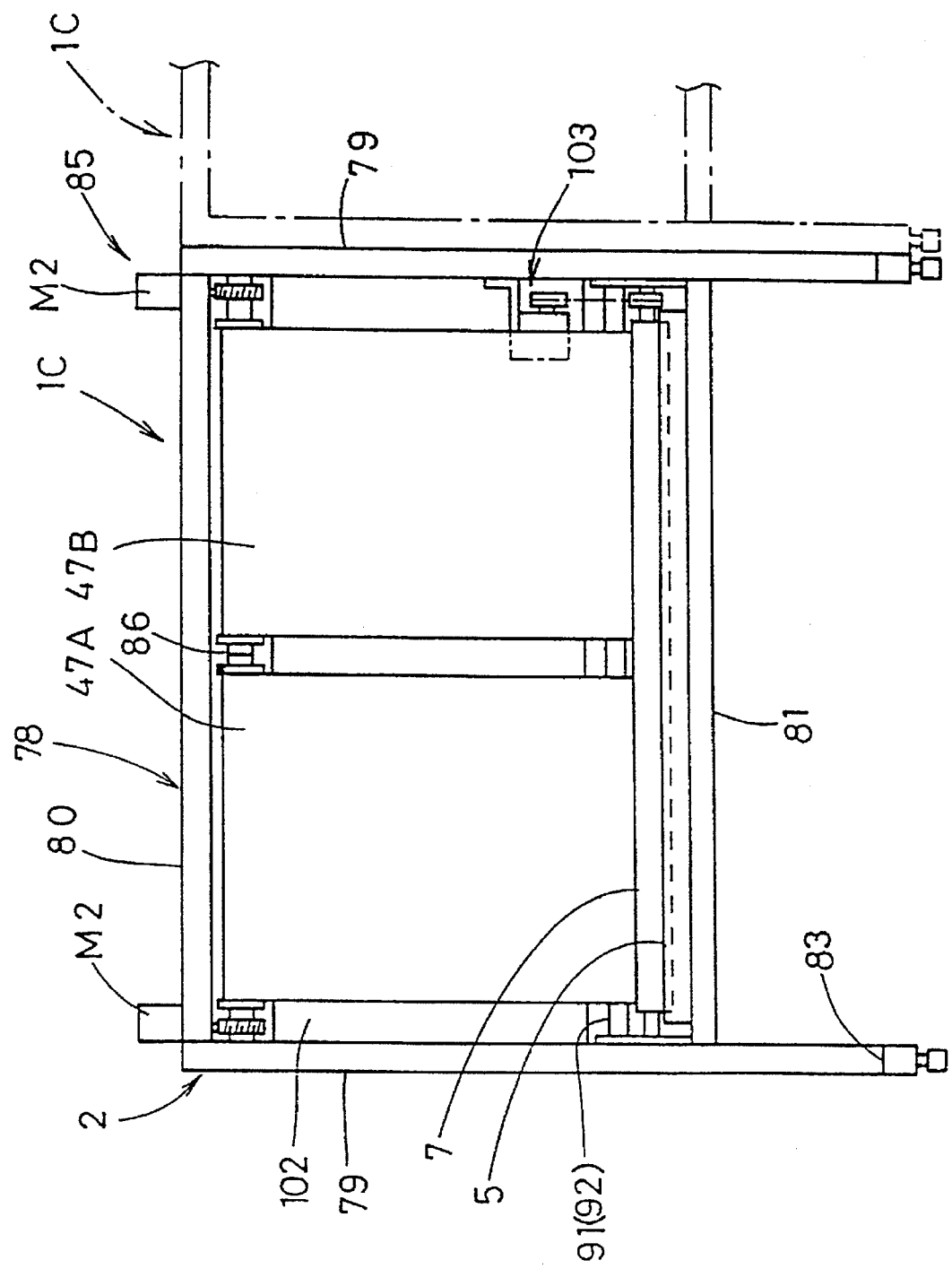
FIG. 14 is a front view showing a device of a third embodiment of the invention.
Figure 15:
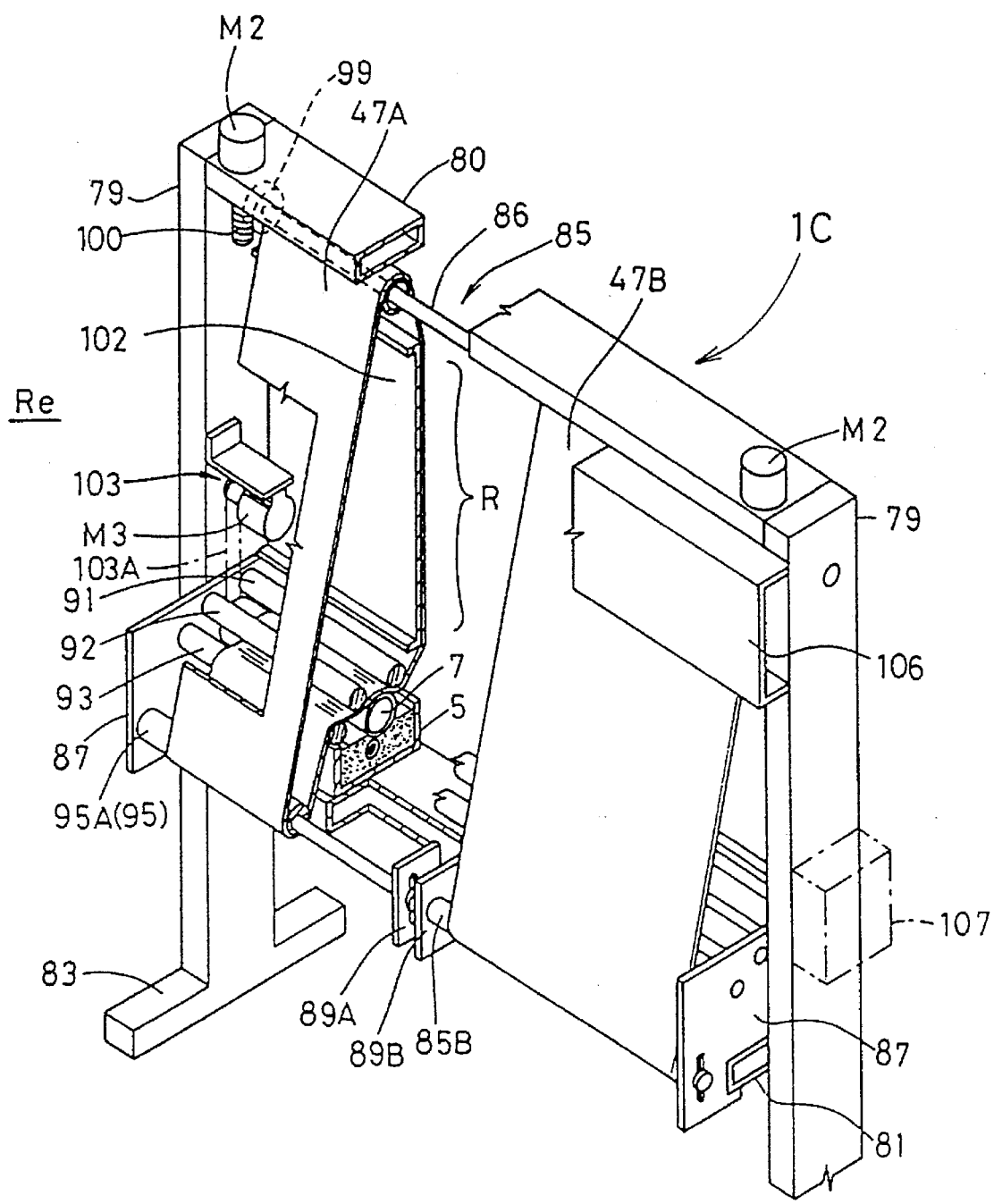
FIG. 15 is its perspective view.

FIG. 14 to FIG. 19 relate to a device 1C in a third embodiment in which the white board 2 is composed of the sheet 47, and a support frame 78 for supporting the sheet 47 rotatably in the longitudinal direction. FIG. 15 shows the device from the rear side Re.

The support frame 78 is a portal shape, as shown in FIG. 14 and FIG. 15 in the embodiment, coupling between upper ends and between middle ends of a pair of vertical frames 79, 79, and a leg 83 is disposed at the lower end of each vertical frame 79. The support frame 78 has a driver 85 for rotating the sheets 47A, 47B in the longitudinal direction.

The driver 85 comprises a drive shaft 86 stretched between the upper ends of the vertical frame 79, first, second and third guide shafts 91, 92, 93 and a tension shaft 95 provided through a side plate 87 disposed at the inner side of the vertical frame 79.

Figure 17:
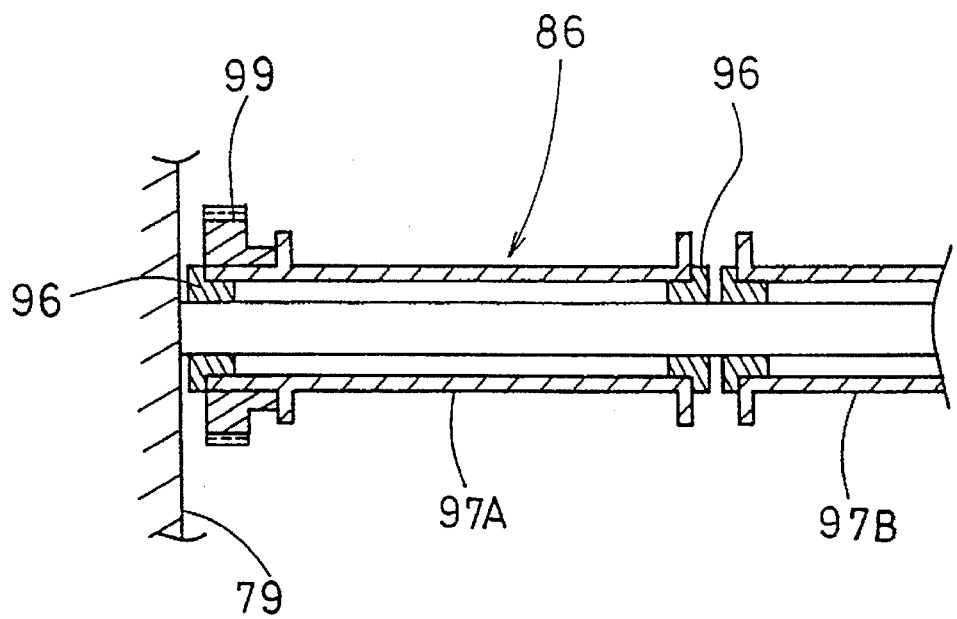
FIG. 17 is a schematic sectional view showing a drive shaft.

The drive shaft 86 comprises, as schematically shown in FIG. 17 for example, a pair of right and left outer tubes 97A, 97B externally inserted rotatably through a bearing piece 96 on the central axis between the vertical frames 79, 79. At the outward ends of the outer tubes 97A, 97B, for example, gears 99 such as worm wheels are affixed, and each gear 99 is engaged with a gear 100 such as worm disposed on each output shaft of the motors M2, M2 mounted, for example, on a horizontal frame 80. Therefore, the outer tubes 97A, 97B can be rotated independently of the operation of the motors M2, and the sheets 47A, 47B wound on the outer tubes 97A, 97B can be driven individually.

Figure 16:
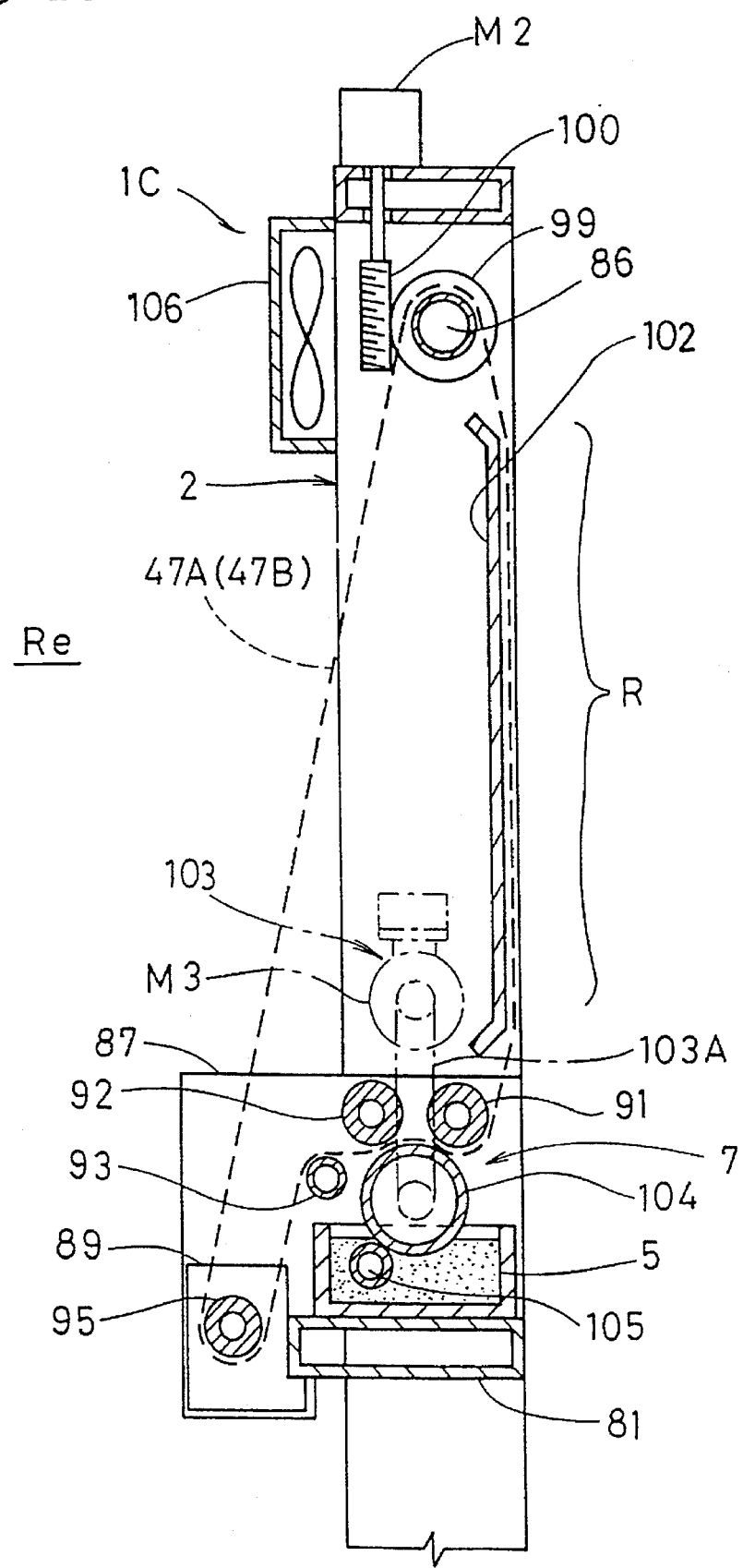
FIG. 16 is its schematic sectional view.

The guide shafts 91, 92, 93 are pivoted between the side plates 87, 87 as shown in FIGS. 15, 16, and the first and second guide shafts 91, 92 receive the back side of the sheets 47A, 47B, and positioned beneath the drive shaft 86 and are installed at the same height mutually in the embodiment. The third guide shaft 93 receive the surface of the sheets 47A, 47B, and is disposed behind the second guide shaft 92.

The tension shaft 95 is a pair of right and left rotary shafts for receiving the back sides of the sheets 47A, 47B, and the tension shafts 95A, 95B are installed adjustably in the height position up and down between the side plates 87, 87 and a pair of side plate pieces 89A, 89B parallel to each other projecting backward from the middle lateral frame piece 81. Therefore, the tension shafts 95A, 95B are flexibly stretched without loosening the sheets 47A, 47B.

The support frame 78 has a back plate 102 for supporting the sheets 47A, 47B on a flat surface from the back side, disposed in the region R between the drive shaft 87 and first guide shaft 91.

The applicator 7 is a roller rubbing element 104 of a relatively large diameter having a rubbing piece composed of sponge material disposed at the surface side in this embodiment, and is pivoted between, for example, the side plates 87, 87, at a position contacting with the first and second guide shafts 91, 92. The rubbing element 104 is connected to a rotary driver 103 in this embodiment.

The rotary driver 103 has a motor M3 mounted, for example, on a vertical frame 79 through a mounting plate on the inner side, and a chain wheel provided at the output shaft of the motor M3 and a chain wheel provided at one end of the rubbing element 104 are coupled with an endless belt 103A.

Therefore, the rubbing element 104 can contact with the surface of the sheets 47A, 47B between first and second guide shafts 91, 92, and rubs the writing surface S. The rubbing element 104 may be divided into right and left halves, and rotated and controlled independently in the right and left halves same as the drive shaft 86.

The liquid tank 5 is a container with a top opening in the embodiment, and is detachably held on the middle lateral frame 81.

The liquid tank 5 holds the liquid to a height for partly soaking the rubbing element 104.

Figure 18:
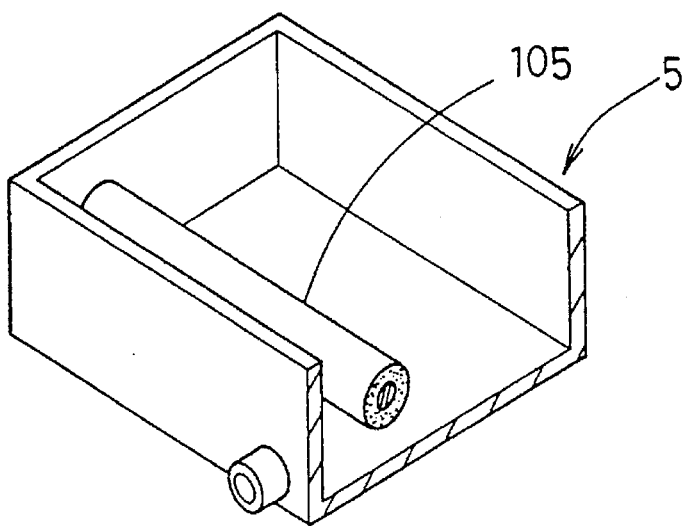
FIG. 18 is a partial perspective view for explaining a liquid tank.

In the liquid tank 5, as shown in FIGS. 16, 18 in the embodiment, a roll 104 contacting with the rubbing element 104 is pivoted inside, and the lower edge of the roll 105 is positioned near the bottom of the liquid tank 5. Therefore, if the remainder of the stored liquid decreases, it is guaranteed that the rubbing element 104 adsorbs water through the roll 105. As the roll 105, sponge, felt, cloth or other material of which water absorption property is same as or larger than the rubbing element 104 is preferred. The roll 105 can move parallel vertically, and is preferred to be thrust upward with spring piece or the like, and hence it is easier to take out from the front of the liquid tank 5, and moreover by installing, the roll 105 and rubbing element 104 contact with each other.

Therefore, when the sheet 47 is wound in the vertical direction, liquid can be supplied to the writing surface S without using pump.

In the embodiment, the support frame 78 is furnished with a drier 106 same as the drier 73, and a refill tank 107 for refilling the liquid tank 5 with liquid. The refill tank 107 may, aside from directly supplying liquid into the liquid tank 5, be automatically supplied through, for example, pipe, closing valve, or the like.

Incidentally, the sheet 47 may be wound only on two support shafts, that is, the drive shaft 86 and first guide shaft 91.

Figure 19:
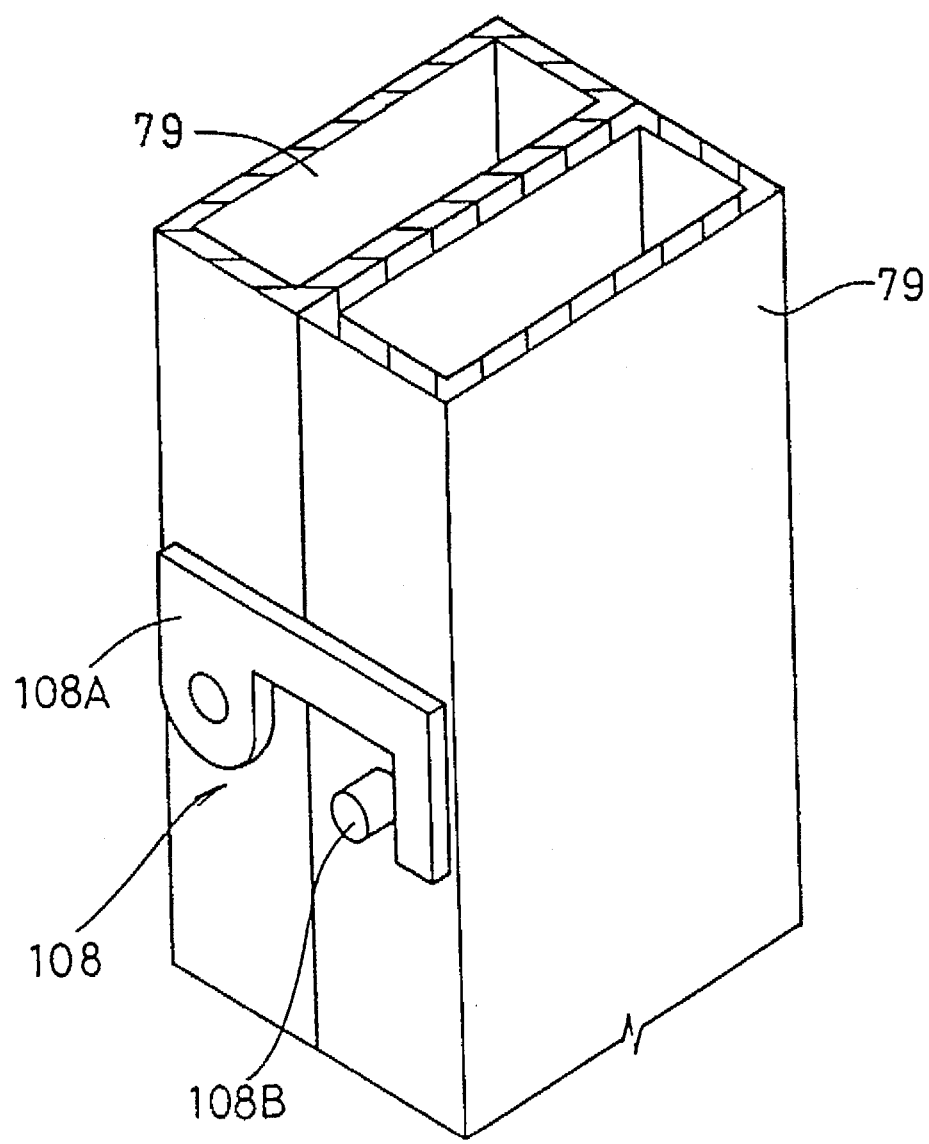
FIG. 19 is a perspective view showing a coupler.

In the writing board device 1 of the invention may be further provided with, as shown in FIG. 19, a coupler 108 comprising an engaging hook 108A for coupling between vertical frames, for example, and a detent pin 108B or the like, and multiple devices i may be coupled horizontally.

As the applicator 7, those disclosed in the first to third embodiments may be properly combined and used in each device 1, so that the writing board device 1 of the invention may be modified in various forms.

Figure 21:
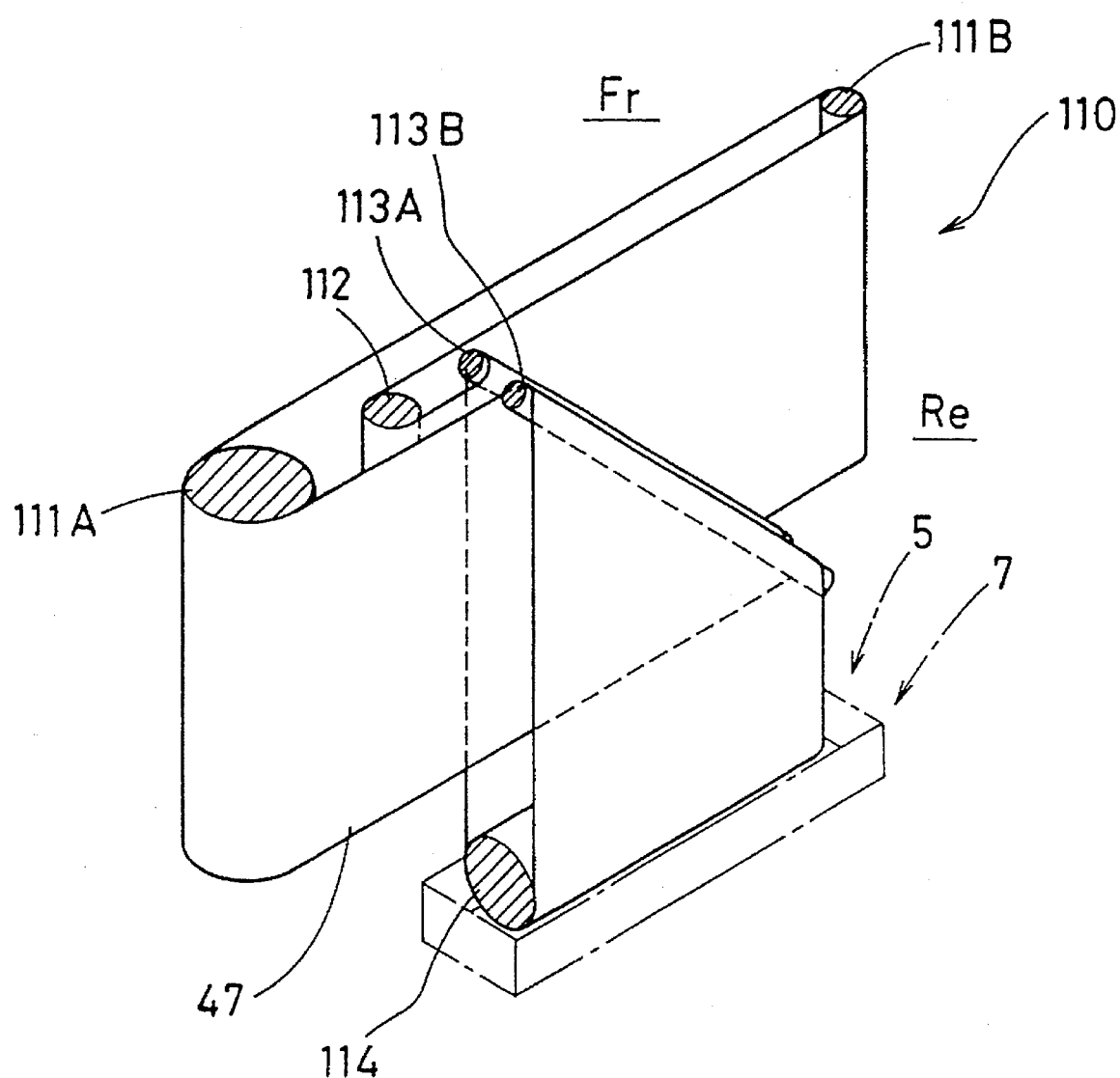
FIG. 21 is a schematic perspective view showing a different embodiment of the sheet winding method.

Concerning rotation of the sheet 47, aside from the lateral direction and vertical direction mentioned above, lateral and vertical directions may be combined as shown in FIG. 21.

A support frame 110 for rotating the sheet 47 by combining vertical and lateral directions comprises vertical main rollers 111A, 111B disposed at right and left ends, a vertical middle roller 112 disposed between them, a pair of front and rear slant rollers 113A, 113B inclined sideways at a slant angle of 45 degrees disposed between the vertical middle roller 112 and one vertical main roller 111B, and a horizontal lateral roller 114 positioned beneath the slant rollers 113A, 113B. The sheet 47 is wound in the sequence of one vertical main roller 111A→other vertical main roller 111B→vertical middle roller 112→front slant roller 113A→lateral roller 114→rear slant roller 113B →vertical main roller 111A, and the vertical peripheral circuit is composed among the slant roller 113A, lateral roller 114 and rear slant roller 113B, while the horizontal peripheral circuit is composed among the remainder.

At this time, it is preferred to form the liquid tank and. applicator 7 in the vertical peripheral circuit, in particular, in the folding portion of the lateral roller 114 at the lowest end, so that the use of pump or the like may be omitted.

What is claimed is:

1. A writing board system comprising a white board having a writing surface for receiving a written mark thereupon, a liquid tank filled with a water for erasing the written mark from the writing surface, an applicator for applying the water in the liquid tank onto the writing surface to erase the written ink, and a writing implement having an ink for forming the written on writing surface including at least one electron donative coloring compound selected from the group consisting of 2-{2-[4-(dodecyloxy)-3-metoxyphenl]-ethenyl}quinoline, 3-cyclohexylamino-6-chlorofluoran, 3-diethyl amino benzo[a]-fluoran, 3-(4-diethylamino-2-etoxyphenyl)-3-(1-ethyl-2-methylindol-3-yl)-4-azaphthalide, 3.3-bis(4-diethylamino-2-etoxyphenyle)-4-azaphthalide, and 3-cyclohexyl methyl amino-6-methyl-7-anilinofluoran, and an electron acceptive developing compound selected from the group consisting of zinc salicylate and bisphenol A.

2. The writing board system of claim 1, wherein the applicator comprises a rubbing element for absorbing the water and rubbing on the writing surface together with the water therein.

3. The writing board system of claim 2, wherein the rubbing element is a sponge.

4. The writing board system of claim 2. wherein the rubbing element is a brush.

5. The writing board system of claim 1, wherein the liquid tank is connected to a pump for feeding the water in the liquid tank onto the writing surface.

6. The writing board system of claim 1, wherein the applicator has a blade rubber for dripping the water on the writing surface.

7. The writing board system of claim 1, wherein the white board is a board having a writing surface at least on one side, and the applicator is fitted to a sliding frame extending above the writing surface and being supported movably along the writing surface.

8. The writing board system of claim 1, wherein the white board comprises a loop sheet having the writing surface on an outer circumference and a support frame rotatably supporting the loop sheet, and the applicator is fitted to the support frame.

* * * * *